United States Patent [19]

Kalahasthy

[11] Patent Number: 5,441,313
[45] Date of Patent: Aug. 15, 1995

[54] INSERTION INDICATOR FOR QUICK CONNECTOR

[75] Inventor: Gopichand Kalahasthy, Clinton Township, Macomb County, Mich.

[73] Assignee: Bundy Corporation, Warren, Mich.

[21] Appl. No.: 183,183

[22] Filed: Jan. 18, 1994

[51] Int. Cl.6 .................... F16L 35/00; F16L 37/084
[52] U.S. Cl. ....................... 285/93; 285/319
[58] Field of Search ................ 285/319, 93, 921

[56] References Cited

U.S. PATENT DOCUMENTS

| | | |
|---|---|---|
| 2,661,768 | 12/1953 | Novak et al. . |
| 4,046,387 | 9/1977 | Lee . |
| 4,572,552 | 2/1986 | Orevik et al. . |
| 4,753,458 | 6/1988 | Case et al. . |
| 4,793,637 | 12/1988 | Laipply et al. . |
| 4,875,715 | 10/1989 | Dennany, Jr. et al. . |
| 4,895,396 | 1/1990 | Washizu . |
| 4,913,467 | 4/1990 | Washizu . |
| 4,915,420 | 4/1990 | Washizu . |
| 4,925,217 | 5/1990 | Ketcham . |
| 4,946,205 | 8/1990 | Washizu . |
| 4,948,176 | 8/1990 | Bartholomew . |
| 4,979,765 | 12/1990 | Bartholomew . |
| 5,069,424 | 12/1991 | Dennany, Jr. et al. . |
| 5,152,555 | 10/1992 | Szabo . |
| 5,178,424 | 1/1993 | Klinger . |
| 5,226,679 | 7/1993 | Klinger . |
| 5,228,728 | 7/1993 | McNaughton et al. . |
| 5,297,818 | 3/1994 | Klinger ................. 285/93 |
| 5,342,099 | 8/1994 | Banner et al. ............ 285/93 |

FOREIGN PATENT DOCUMENTS

| | | |
|---|---|---|
| 0505930 | 9/1992 | European Pat. Off. . |
| 0525414 | 2/1993 | European Pat. Off. . |
| 63-44502 | 7/1988 | Japan . |
| 2216213 | 10/1989 | United Kingdom . |
| 2217417 | 10/1989 | United Kingdom . |
| 8403927 | 10/1984 | WIPO . |

OTHER PUBLICATIONS

IBM Technical Disclosure Bulletin, "Clicking Connector", M.C. Panaro, Dec. 1958.

*Primary Examiner*—Eric K. Nicholson
*Attorney, Agent, or Firm*—Dorn, McEachran, Jambor & Keating

[57] ABSTRACT

A quick connector coupling for forming a joint in a fluid line consists of a female connector body having a bore which receives a male member. A retainer disposed in the bore includes retention fingers which extend between first abutment surfaces formed in the connector body and an upset formed on the male member to secure the male member in the connector body. An insertion indicator disposed in the bore has an indicator ring which is seated against a radial rim formed adjacent an entrance to the connector body bore, legs extending away from the indicator ring and into the bore, and engagement means attached to the legs which abut second abutment surfaces formed in the connector body to position the insertion indicator in the connector body. The indicator ring is separable from the engagement means to signal a proper coupling of the male member and female connector body.

12 Claims, 5 Drawing Sheets

INSERTION INDICATOR FOR QUICK CONNECTOR

BACKGROUND OF THE INVENTION

This invention relates to fluid line systems which include quick connector couplings, and more particularly to a quick connector coupling having means to verify whether a proper connection has been made between the male and female portions of the quick connector.

In automotive and other fields, quick connector couplings, which generally include a male member received and retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

Not unexpectedly, an improper connection between the male member and female connector body of a quick connector coupling can have deliterious effects on the fluid line system. At the very least, a leak in the fluid system will occur at the site of the improper connection. More serious and potentially dangerous consequences can result if the fluid is pressurized, as many fluids in automotive systems are. Thus, a reliable and accurate means for verifying a proper connection between the male member and female connector body is advantageous.

A number of methods and mechanisms exist for verification of proper connection of a quick connector coupling. The coupling may be physically checked by tugging or pulling on the male member. An improper connection is obvious if the male member disengages the female connector body. Reliance on physical inspection, however, has numerous disadvantages. The pulling or tugging force exerted on the male member may not be enough to cause the male member to disengage the connector body, even though an improper connection in fact exists. Further, the quick connector coupling may be inaccesibly located, for example, in a crowded engine compartment, making physical inspection difficult and burdensome.

It is sometimes possible to audibly verify a proper connection. Typically, as the male member is inserted into the female connector body, an audible "click" is heard when the male member locks into place. The click results from resilient arms of a retainer contained within the female connector body snapping into place behind an enlarged diameter upset portion formed on the male member. This method of verification is also deficient in several respects. The click may be very quiet or inaudible, making its detection difficult. Background noise in the workplace can make the task even more difficult. And, of course, an audio method of verification is inherently limited by the installer's hearing perception.

Generally, visual methods of connection verification have proven to be the most reliable. Various methods and mechanisms for visual verification of proper connection of a quick connector coupling are shown in U.S. Pat. Nos. 5,178,424, 5,152,555, 5,069,424, 4,979,765, 4,948,176, 4,946,205, 4,925,217, 4,915,420, 4,913,467, 4,895,396, 4,793,637, and 4,753,458.

The methods of visual connection verification shown in these patents also have various shortcomings. Many rely on the appearance or position of an indicator device at, or in the immediate vicinity of, the coupling itself. The indicator is not disengaged from the connector body, rather, the position of the indicator device relative to the connector body is indicative of whether there is a proper connection. As with methods of physical inspection, the usefulness of such devices is limited if the coupling is inaccesibly located or difficult to see. Furthermore, the indicator mechanisms employed in some of the prior connectors are overly complex and may protrude an objectionable amount from the connector body.

In other prior devices, a proper connection is signaled by complete disengagement of an indicator device from a connector body. Typically, upon proper connection, an indicator ring becomes freely moveable on the male member, making verification of a proper connection easy. These prior devices have been deficient, however, in that a potential exists to achieve a proper connection without concomittant release of the indicator device. In such cases, a false signal of an improper connection is given, requiring expenditure of time and effort to inspect the connection.

The quick connector insertion indicator of the present invention overcomes these prior deficiencies.

SUMMARY OF THE INVENTION

The present invention provides a quick connector coupling for forming a joint in a fluid line system. The coupling includes a female connector body which receives a male member. A bore extends axially inwardly into the female connector body from an entrance. A radial rim is formed adjacent the entrance to the connector body, and a pair of first abutment surfaces and a pair of second abutment surfaces are formed in the connector body axially inwardly of the entrance. The first abutment surfaces are circumferentially spaced ninety degrees from the second abutment surfaces. The male member is received within the bore of the connector body and has a radially enlarged upset.

A retainer is disposed within the bore of the connector body. It has retention fingers extending between the first abutment surfaces and the upset of the male member to retain the male member within the bore.

An insertion indicator is also disposed within the bore. The insertion indicator includes an indicator ring which abuts the radial rim adjacent the entrance to the connector body, legs which extend axially into the bore away from the indicator ring, and engagement means connected to an end of each leg remote from the ring. The engagement means abut the second abutment surfaces to position the insertion indicator within the bore. The indicator ring is separable from the engagement means to provide visual confirmation of a proper connection.

In a first embodiment, the engagement means consist of a foot attached to the end of each leg by a rupturable transition portion. Each foot consists of a portion projecting radially outwardly and abutting a second abutment surface, and a portion projecting radially inwardly into the bore. The upset of a male member which is being inserted into the connector body contacts the radially inwardly projecting portion, causing it to rotate in a direction away from the upset. In turn, the radial outwardly projecting portion is pressed against the second abutment surface. Upon attainment of a proper connection, the transition portion ruptures, freeing the indicator ring and signaling a proper coupling.

In a second embodiment, the engagement means consist of a second ring fixedly attached to the ends of the legs. The other leg ends are attached to the indicator ring by a rupturable transition portion. Knobs project radially outwardly from the second ring to abut the second abutment surfaces. The second ring is engaged by the upset of an inserted male member, causing corresponding axial movement of the second ring. This places stress on the transition portion. When a proper connection is achieved, the transition portion ruptures, freeing the indicator ring and signaling a proper coupling.

DETAILED DESCRIPTION OF THE PREFERRED EMBODIMENTS

Figure 1:
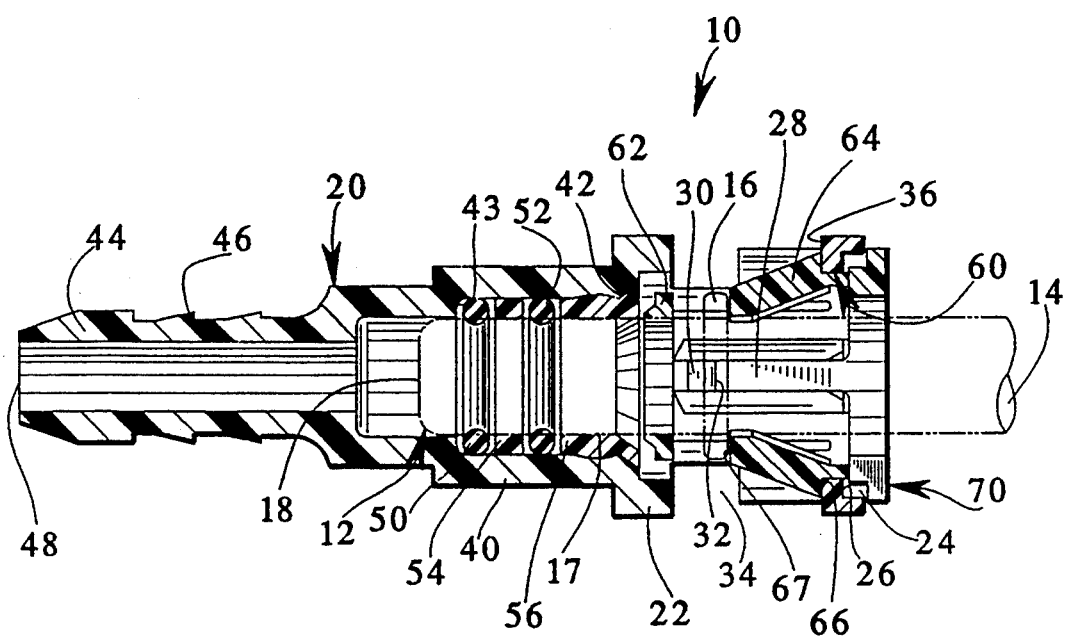
FIG. 1 is a sectional view of a quick connector coupling which embodies the present invention.
Figure 2:
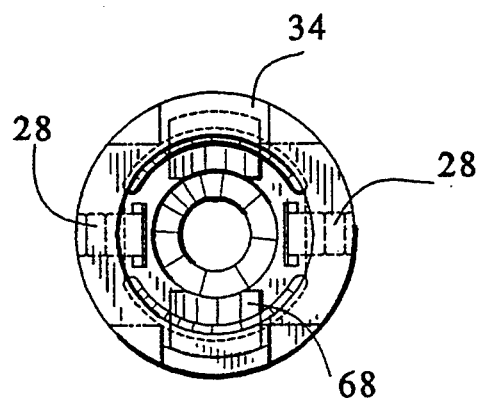
FIG. 2 is a front elevation view of the quick connector coupling of FIG. 2.

A quick connector coupling formed in a fluid line system is designated as 10 in FIG. 1. Quick connector coupling 10 is comprised of a female connector body 20 and a male member 12 formed at an end of a tube 14 which forms a part of a fluid line system. In use, female connector body 20 is, in turn, connected to flexible tubing (not shown) which is also a component of the fluid line system. Female connector body 20 and male member 12 are connectable to form a permanent, but severable, joint.

Female connector body 20 is hollow and defines a bore 21. It is preferably made of a plastic material, such as nylon-12. An enlarged retainer housing portion 22 is formed at an end of connector body 20 having an entrance 24 defined by a radial annular rim 26. A pair of one-hundred eighty (180) degree circumferentially displaced, axial guiding slots 28 are formed in retainer housing portion 22 and extend from rim 26 away from entrance 24. A rectangular opening 30 is formed through connector body 20 at the end of each slot 28. Openings 30 define radial pivot surfaces 32 facing away from entrance 24, the purpose of which will be described herein.

A pair of windows 34 are formed in retainer housing portion 22 of connector body 20. Windows 34 are much larger than, and circumferentially spaced ninety (90) degrees from, openings 30. Windows 34 define radial abutment surfaces 36 facing away from entrance 24, the purpose of which will be described herein.

Female connector body 20 further includes a seal housing portion 40. Seal housing portion 40 is of reduced diameter relative to retainer housing portion 22 and extends between a conical shoulder 42 adjacent retainer housing portion 22 and a radial shoulder 43 remote from retainer housing portion 22.

Tubing connection portion 44 is formed at an end of connector body 20 remote from entrance 24. Barbs 46 are formed in the exterior of tubing connection portion 44 to facilitate connection to flexible tubing. An open end 48 provides communication with the flexible tubing. Connection portion 44 could be configured in alternative ways for connection to other system arrangements. For example, threads could be formed in its outer periphery to facilitate connection within a threaded bore of a housing containing a system component.

Male member 12 is received within female connector body 20 and includes an enlarged upset 16 formed a given distance from an open end 18. A cylindrical sealing surface 17 extends between upset 16 and end 18. Male member 12 is typically formed at the end of a rigid, metal tube 14.

Disposed within seal housing portion 40 are inner and outer "O" ring seals 50 and 52, and hollow inner and outer spacers 54 and 56. Inner "O" ring 50 is secured in connector body 20 between inner spacer 54 and radial shoulder 43. "O" ring 50 is preferably made of fluorosilicone or fluorocarbon rubber. Outer "O" ring 52 is secured between inner spacer 54 and outer spacer 56. Spacer 56 has a conically enlarged end which seats against conical shoulder 42 formed in connector body 20. "O" ring 52 is preferably made of toughened fluorosilicone. Both spacers 54 and 56 are made of plastic, such as nylon-12.

A flexible plastic retainer 60 is disposed within retainer housing portion 22 of female connector body 20. Retainer 60 includes an annular ring 62 disposed in an end of retainer housing portion 22 adjacent seal housing portion 40. Ring 62 surrounds, and has approximately the same diameter as, male member 12. A pair of one-hundred eighty (180) degree circumferentially displaced tabs (not shown) project radially from ring 62 and are received in axial guide slots 28. These tabs assist in the alignment of retainer 60 within retainer housing portion 22 and help to guide retainer 60 to an installed position.

Two circumferentially spaced arms extending away from annular ring 62 support ramped retention fingers 64. A radial locking surface 66 formed at one end of each finger 64 engages radial abutment surface 36 of connector body 20 to secure retainer 60 within connector body bore 21. An edge 67 of each finger 64 remote from locking surface 66 engages upset 16 of male member 12 to prevent withdrawl of male member 12 from connector body 20. In an installed position, edges 67 of fingers 64 are circumferentially aligned with rectangular windows 30 formed in connector body 20.

Figure 3:
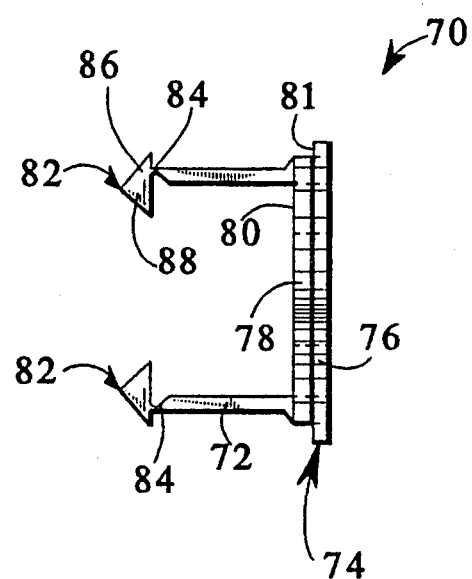
FIG. 3 is a side elevation view of an insertion indicator employed in the quick connector coupling of FIG. 1.
Figure 4:
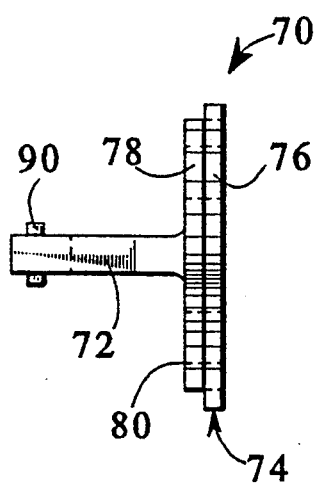
FIG. 4 is a side elevation view of the insertion indicator of FIG. 3, rotated ninety degrees.
Figure 5:
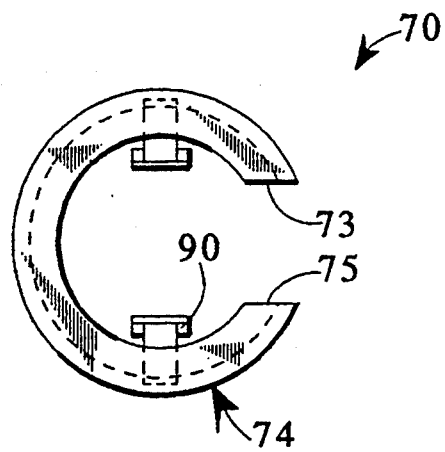
FIG. 5 is a front elevation view of the insertion indicator of FIG. 3.

Also disposed in retainer housing portion 22 of connector body 20 is an insertion indicator 70. Indicator 70, illustrated in detail in FIGS. 3-5, includes two legs 72 extending axially from a semi-circular stepped ring 74.

Stepped ring 74 extends circumferentially between two opposed ends 73 and 75 and surrounds male member 12. Ring 74 is defined by a larger diameter outer ring portion 76 and a smaller diameter inner ring portion 78. Undersurface 80 of inner ring portion 78 abuts radial annular shoulder 26 formed at the entrance 24 of connector body 20, and undersurface 81 of outer ring portion 76 abuts an outer peripheral surface of connector body 20.

Indicator 70 is sized to fit snugly within connector body 20. The outer diameter of outer ring portion 76 matches the outer diameter of connector body 20, and the inner diameters of ring portions 76 and 78 match the inner diameter of connector body 20.

Legs 72 are circumferentially spaced about ring 74 by one-hundred eighty (180) degrees. They extend axially away from inner ring portion 78 and are received within axial guide slots 28. When installed, legs 72 are circumferentially spaced from retention fingers 64 of retainer 60 by ninety (90) degrees. Thus, retainer 60 and insertion indicator 70 may be disposed simultaneously within connector body 20 without interfering with each other.

A foot 82 is connected to the end of each leg 72 remote from ring 74 by a narrowed transition portion 84. Transition portion 84 is easily rupturable to allow separation of feet 82 from legs 72. When installed, and prior to insertion of male member 12 into connector body 20, feet 82 are received by rectangular openings 30 in connector body 20 and are in circumferential alignment with finger edges 67 of retainer 60. A radially outer portion 86 of each foot 82 projects into a corresponding opening 30 and has a planar surface of engagement with radial pivot surface 32 defined by the opening 30.

When indicator member 70 is in a relaxed, or uninstalled, position, the distance between the outer extents of the radially outer portions 86 of each foot 82 is greater than the inside diameter of retainer housing portion 22 of connector body 20. Thus, indicator legs 72 must be compressed radially inwardly somewhat in order to move indicator 70 into connector body 20. When feet 82 come into alignment with openings 30, feet 82 "snap" into place, with radially outer portions 86 abutting against pivot surface 32 to prevent withdrawl of indicator 70 from connector body 20.

A radially inner portion 88 of each foot 82 projects away from opening 30 and into connector body bore 21 immediately adjacent retainer finger edges 67. Each radially inner portion 88 has a widened, or enlarged, surface 90, the function of which will be described shortly.

Quick connector coupling 10 is connected by inserting male member 12 into bore 21 of female connector body 20. Inwardly sloping retention fingers 64 of retainer 60 resist insertion of upset 16 formed on male member 12. With application of sufficient force, they flex outwardly to allow passage of upset 16. Once this resistance is overcome, and upset 16 passes finger edges 67, retention fingers 64 "snap" into place behind upset 16 and edges 67 engage a radial surface of upset 16 opposite from end 18 of male member 12, preventing withdrawl of male member 12 from connector body 20. "O" rings 50 and 52 form a fluid seal between sealing surface 17 of male member 12 and the interior of seal housing portion 40 of connector body 20.

Simultaneous with attainment of a secure connection by the passage of upset 16 by finger edges 67 of retainer 60, transition portions 84 of insertion indicator 70 are ruptured, separating ring 74 and legs 72 from feet 82 and freeing the ring and legs to move along tube 14, signaling a complete compling.

Rectangular openings 30 in connector body 20, in which feet 82 are disposed, are circumferentially aligned with finger edges 67 of retainer 60. Thus, as upset 16 passes finger edges 67, it engages radially inner portions 88 of feet 82. Widened surfaces 90 of feet radially inner portions 88 increase the amount of surface contact between upset 16 and radially inner portions 88. The engagement of indicator ring 74 with shoulder 26 of connector body 20 prevents a corresponding axial displacement of ring 74 and legs 72. Thus, as upset 16 continues to move inwardly, feet 82 are forced to rotate in a direction away from the path of male member 12. The abutment of radially outer feet portions 86 against radial pivot surfaces 32 limits this rotation, placing tension on transition portions 84 as axial movement of male member 12 continues. Movement of upset 16 fully past retainer finger edges 67 causes a rupteure of transition portions 84, freeing ring 74 and legs 72 to move along tube 14 and signaling a complete connection.

The widened surfaces 90 of radially inner portions 88 of feet 82 serve the additional function of confining radially inner portions 88 inside connector body 20 after transition portion 84 has ruptured. Widened surfaces 90 are too wide to pass through retangular openings 30. Thus, the broken-off portions of feet 82 are not allowed to escape into the environment external to quick connector coupling 10.

Figure 6:
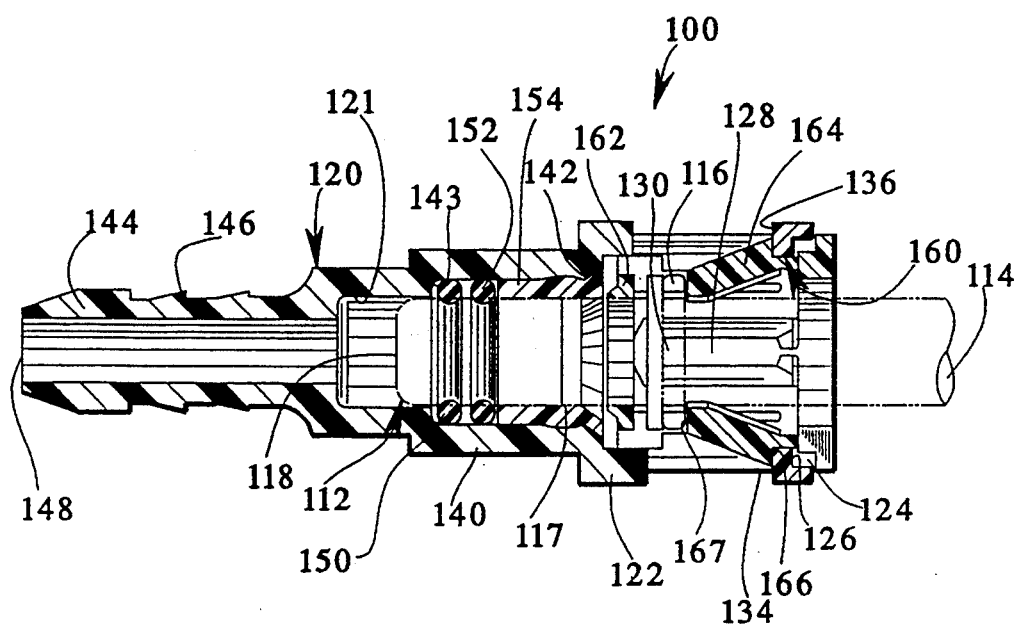
FIG. 6 is a sectional view of a quick connector coupling representing a second embodiment of the present invention.

A quick connector coupling representing a second embodiment of the present invention is designated as 100 in FIG. 6. Quick connector coupling 100 is comprised of a female connector body 120 and a male member 112 formed at an end of a tube 114 which forms a part of a fluid line system.

Figure 7:
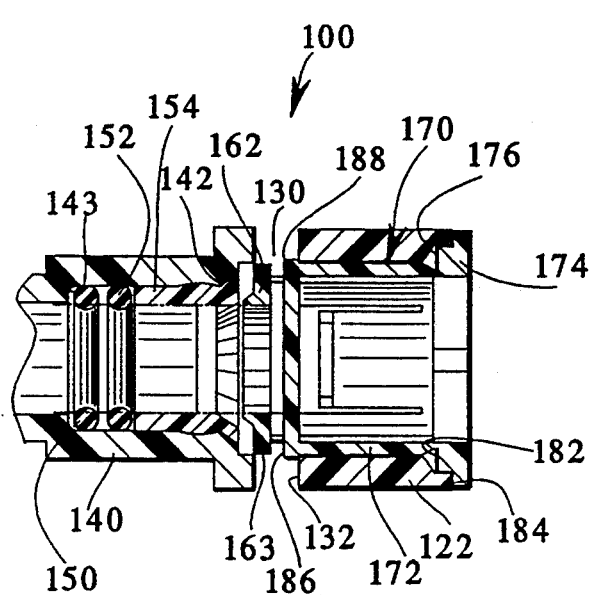
FIG. 7 is a partial sectional view of the quick connector coupling of FIG. 6, rotated ninety degrees.
Figure 8:
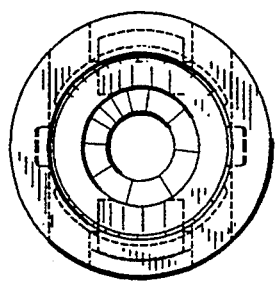
FIG. 8 is a front elevation view of the quick connector coupling of FIG. 6.

The design of connector body 120 and male member 112 is very similar to that of connector body 20 and male member 12 of the first quick connector embodiment 10. Connector body 120 is hollow, defining a bore 121. An enlarged retainer housing portion 122 is formed at an end of connector body 120 having an entrance 124 defined by a radial, annular rim 126. A pair of one-hundred eighty (180) degree circumferentially displaced, axial guide slots 128 are formed in retainer housing portion 122 and extend from rim 126 away from entrance 124. A rectangular opening 130 (best seen in FIG. 7) is formed through connector body 120 at the end of each slot 128. Openings 130 define insertion indicator abutment surfaces 132 facing away from entrance 124.

A pair of windows 134 (best seen in FIG. 6) are also formed in retainer housing portion 122. Windows 134 are larger than, and circumferentially spaced ninety (90) degrees from, rectangular openings 130. Windows 134 define retainer abutment surfaces 136 facing away from entrance 124.

Connector body 120 further includes seal housing portion 140. It is of reduced diameter relative to retainer housing portion 122 and extends between a conical shoulder 142 adjacent retainer housing portion 122 and a radial shoulder 143 remote from retainer housing portion 122.

Tubing connection portion 144 is formed at an end of connector body 120 remote from entrance 124. Barbs 146 are formed in the exterior of tubing connection portion 144 to facilitate connection to flexible tubing. An open end 148 provides communication with the flexible tubing.

Male member 112 is received within connector body 120 and includes an enlarged upset 116 formed a given distance from an open end 118. A cylindrical sealing surface 117 extends between upset 116 and end 118. Male member 112 is typically formed at the end of a rigid, metal tube 114.

Disposed within seal housing portion 140 are "O" ring seals 150 and 152, and hollow spacer 154. "O" rings 150 and 152 are secured in connector body 120 between spacer 154 and radial shoulder 143. Spacer 154 has a conically enlarged end which seats against conical shoulder 142 formed in connector body 120.

A flexible plastic retainer 160 is disposed within retainer housing portion 122 of connector body 120. Retainer 160 is of the same type as that utilized in the first illustrated quick connector embodiment 10. It includes an annular ring 162 disposed in an end of retainer housing portion 122 adjacent seal housing portion 140. Ring 162 surrounds, and has approximately the same diameter as, male member 112. A pair of one-hundred eighty (180) degree circumferentially displaced tabs 163 (FIG. 7) project radially from ring 162 and are received in axial guide slots 128. Tabs 163 assist in the alignment of retainer 160 within retainer housing portion 122 and help to guide retainer 160 to an installed position.

Two circumferentially spaced arms extending away from annular ring 162 support ramped retention fingers 164. A radial locking surface 166 formed at one end of each finger 164 engages retainer abutment surface 136 of connector body 120 to secure retainer 160 within connector body bore 121. An edge 167 of each finger 164 remote from locking surface 166 engages upset 116 of male member 112 to prevent withdrawl of male member 112 from connector body 120. In an installed position, edges 167 of fingers 164 are circumferentially aligned with rectangular windows 130 formed in connector body 120.

Figure 9:
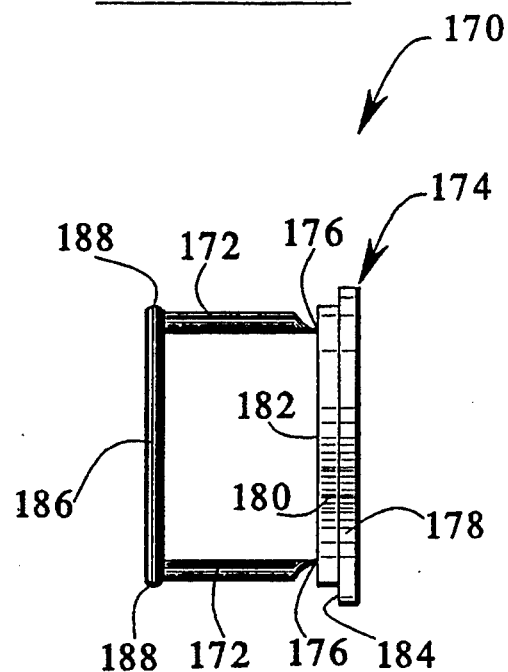
FIG. 9 is a side elevation view of an insertion indicator employed in the quick connector coupling of FIG. 6.
Figure 10:
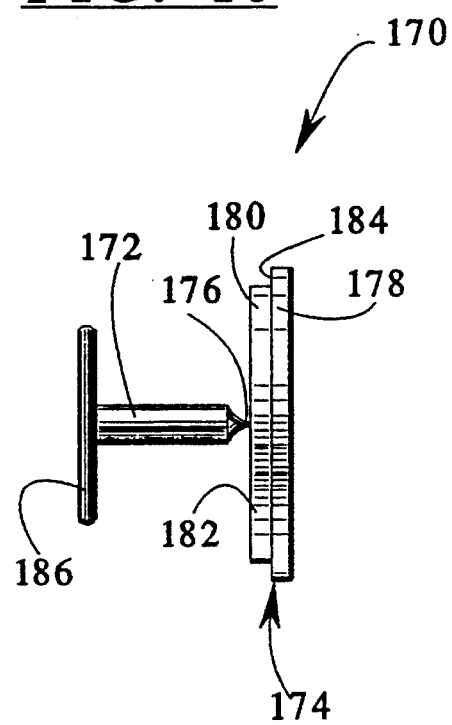
FIG. 10 is a side elevation view of the insertion indicator of FIG. 9, rotated ninety degrees.
Figure 11:
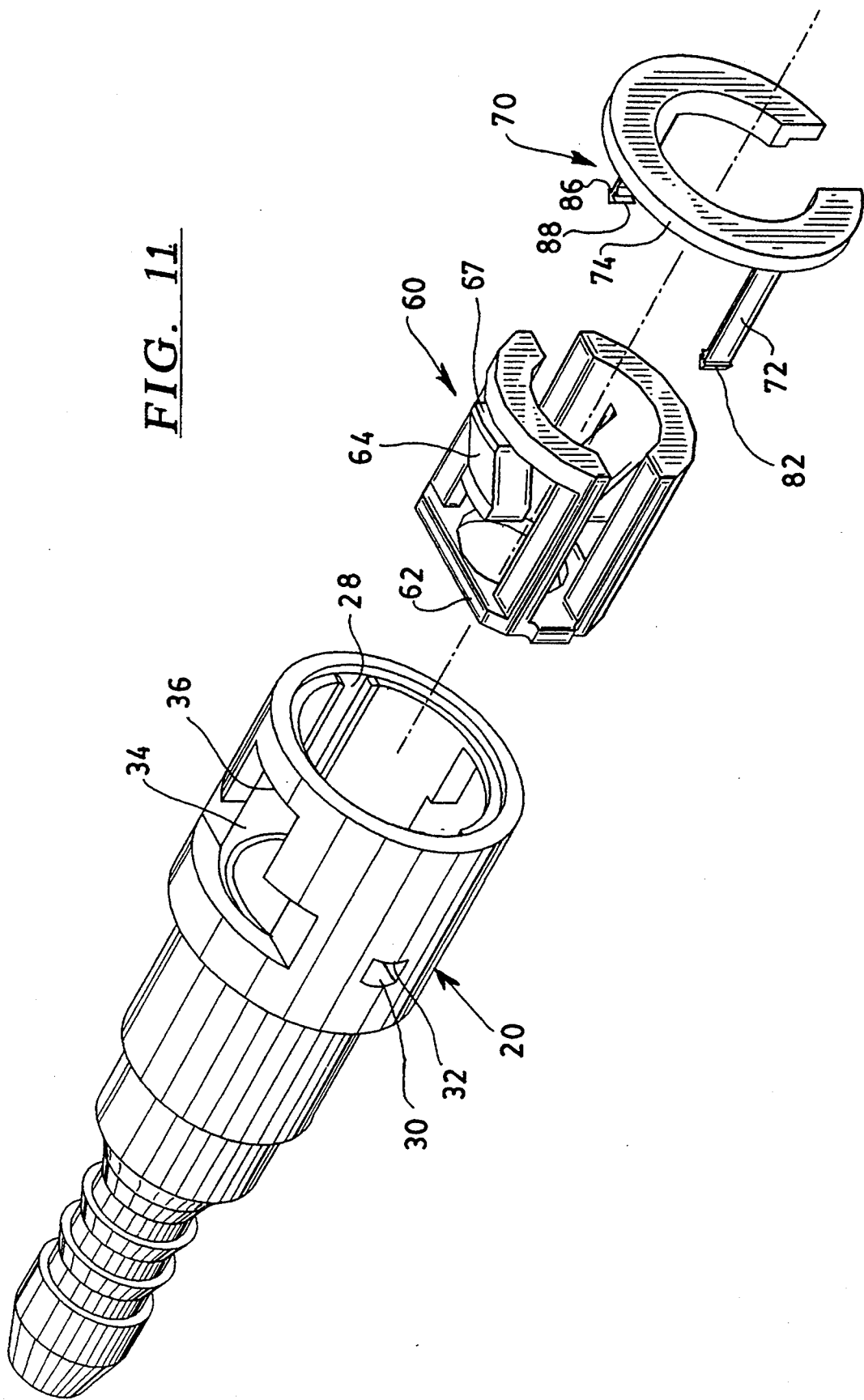
FIG. 11 is an exploded perspective of a connector body, retainer and indicator according to the present invention.

Insertion indicator 170 is also disposed in retainer housing portion 122 of connector body 120. Indicator 170, illustrated in detail in FIGS. 9 and 10, includes two legs 172 extending axially from a stepped ring 174. Legs 172 are connected to ring 174 by a transition portion 176 which is easily rupturable to allow separation of ring 174 from legs 172.

Stepped ring 174 surrounds male member 112 and is defined by a larger diameter outer ring portion 178 and a smaller diameter inner ring portion 180. Undersurface 182 of inner ring portion 180 abuts annular shoulder 126 formed at the entrance 124 of connector body 120, and under surface 184 of outer ring portion 178 abuts an outer peripheral surface of connector body 120. Indicator 170 is sized to fit snugly within connector body 120. The outer diameter of outer ring portion 178 matches the outer diameter of connector body 120, and the inner diameters of ring portions 178 and 180 match the inner diameter of connector body 120.

Legs 172 are circumferentially spaced about ring 174 by one-hundred eighty (180) degrees. The extend axially away from transition portions 176 and are received within axial guide slots 128. When installed, legs 172 are circumferentially spaced from retention fingers 164 of retainer 160 by ninety (90) degrees. Thus, retainer 160 and insertion indicator 170 may be disposed simultaneously within connector body 120 without interfering with each other.

A second ring 186 is connected to the ends of legs 172 remote from stepped ring 174 and is disposed immediately adjacent edges 167 of retention fingers 164. The connection between ring 186 and legs 172 is a permanent, rather than a rupturable, connection. A radially projecting knob 188 is formed on each leg 172 at its point of intersection with ring 186. When installed, and prior to insertion of male member 112 into connector body 120, knobs 188 project into rectangular openings 130 in connector body 120 to limit both axial and rotational movement of indicator 170 within connector body 120.

When indicator member 170 is in a relaxed, or uninstalled, position, the distance between the outer extents of knobs 188 is greater than the inside diameter of retainer housing portion 122 of connector body 120. Thus, indicator 170 is radially compressed when moved through connector body 120. When knobs 188 come into alignment with openings 130, the knobs "snap" into place, with indicator abutment surface 132 preventing withdrawl of indicator 170 from connector body 120.

Quick connector coupling 100 is assembled by inserting male member 112 into bore 121 of female connector body 120. Inwardly sloping retention fingers 164 of retainer 160 resist insertion of male member 112, due to the presence of enlarged upset 116. Once this resistance is overcome, and upset 116 passes finger edges 167, retention fingers 164 "snap" into place behind upset 116 to prevent withdrawl of male member 112 from connector body 120. "O" rings 150 and 152 form a fluid seal between sealing surface 117 of male member 112 and the interior of seal housing portion 140 of connector body 120.

Simultaneous with the attainment of a secure connection by the passage of upset 116 by finger edges 167 of retainer 160, transition portions 176 of insertion indicator 170 are ruptured, separating ring 174 from the rest of the indicator and freeing it to move along tube 114, signaling a complete coupling.

Since ring 186 is disposed immediately adjacent retainer finger edges 167, it is engaged by upset 116 of male member 112 as upset 116 is passing finger edges 167. The engagement of stepped ring 174 with shoulder 126 of connector body 120 prevents corresponding axial displacement of ring 186. Thus, as upset 116 continues to move inwardly against ring 186, increasing tension is placed upon transition portions 176 of indicator 170. When upset 116 has moved fully past retainer finger edges 167, this tension causes a rupturing of transition protions 176, freeing ring 174 to move along tube 14 and signaling a complete connection.

Various features of the present invention have been explained with reference to the embodiments shown and described. It must be understood, however, that modification may be made without departing from the spirit and scope of the invention.

I claim:

1. A quick connector coupling for forming a joint in a fluid line system comprising:

a female connector body defining a bore, said bore extending axially inwardly into said connector body from an entrance, a radial rim being defined in said connector body adjacent said entrance, and a pair of first abutment surfaces and a pair of second abutment surfaces being defined in said connector body axially inwardly of said entrance, said first abutment surfaces being circumferentially spaced ninety degrees from said second abutment surfaces;

a male member received within said bore of said connector body and having a radially enlarged upset portion;

a retainer disposed within said bore of said connector body and having retention fingers extending between said first abutment surfaces and said upset portion of said male member to secure said male member within said bore; and an insertion indicator disposed within said bore, said insertion indicator including an indicator ring seated against said radial rim adjacent said entrance, legs extending away from said indicator ring and into said bore, and engagement means connected to an end of each leg remote from said ring, said engagement means cooperating with said second abutment surfaces to fix said insertion indicator axially relative to said connector body prior to coupling, and said engagement means being separable from said indicator ring upon a proper coupling to permit axial movement of said indicator ring, signaling a proper coupling.

2. A quick connector coupling as recited in claim 1, wherein said first abutment surfaces are defined by first openings in said connector body, and said second abutment surfaces are defined by second openings in said connector body.

3. A quick connector coupling as recited in claim 2, wherein said engagement means consists of a foot connected to the end of each leg by a rupturable transition portion, each foot including a radially outwardly projecting portion extending into one of said second openings and abutting one of said second abutment surfaces, and a radially inwardly projecting portion extending into said bore and being engageable with said upset of said male member.

4. A quick connector coupling as recited in claim 3, wherein said feet are axially aligned with edges of said retention fingers of said retainer remote from said first abutment surfaces, such that upon passage of said upset portion of said male member by said edges of said retention fingers, said upset portion engages said radially inwardly projecting portions of said feet to cause rotational movement of said feet in a direction away from said upset, and in turn, said radially outwardly projection portions of said feet pivot against said second abutment surfaces, causing rupture of said transition portions and release of said indicator ring to signal a proper coupling.

5. A quick connector coupling as recited in claim 4, wherein said radially inwardly projecting portions of said feet include a widened surface which increases area of contact between said radially inwardly projecting portion and said upset, and which prevents escape of said feet through said second openings in said connector body after rupture of said transition portions.

6. A quick connector coupling as recited in claim 3, wherein said bore of said connector body further defines axial guide slots extending between said second openings in said connector body and said entrance, said guide slots receiving and guiding said legs of said insertion indicator.

7. A quick connector coupling as recited in claim 6, wherein the distance between outer extents of said radially outwardly projecting portions of said feet is greater than the distance between said axial guide slots, such that said insertion indicator must be compressed for movement through said bore.

8. A quick connector coupling as recited in claim 2, wherein said engagement means consists of a second ring fixedly attached to the ends of said legs, and circumferentially spaced knobs extending radially outwardly of said second ring and into said second openings to abut said second abutment surfaces.

9. A quick connector coupling as recited in claim 8 wherein said legs are connected to said indicator ring by a rupturable transition portion.

10. A quick connector coupling as recited in claim 9 wherein said second ring is axially aligned with edges of said retention fingers remote from said first abutment surfaces, such that upon passage of said upset portion of said male member by said retention finger edges, said upset portion engages said second ring, causing axial displacement of said second ring, and in turn, breakage of said transition portions and release of said indicator ring to signal a proper coupling.

11. A quick connector coupling as recited in claim 8, wherein said bore of said connector body further defines axial guide slots extending between said second openings in said connector body and said entrance, said guide slots receiving and guiding said legs of said insertion indicator.

12. A quick connector coupling as recited in claim 11, wherein the distance between outer extents of said knobs is greater than the distance between said axial guide slots, such that said insertion indicator must be compressed for movement through said bore.

* * * * *